Figure 9:
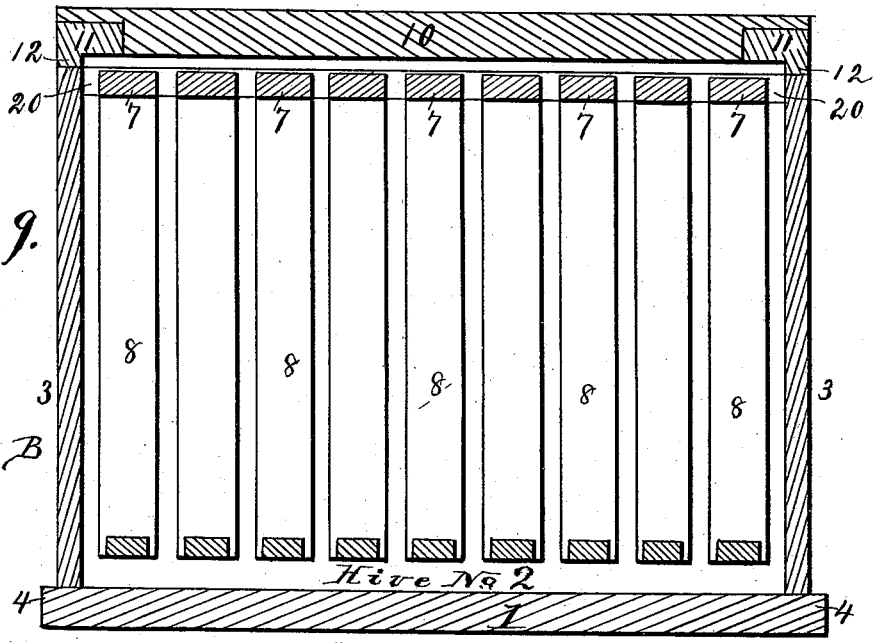

(No Model.) 6 Sheets—Sheet 1.
F. DANZENBAKER.
BEE HIVE.
No. 375,269. Patented Dec. 20, 1887.
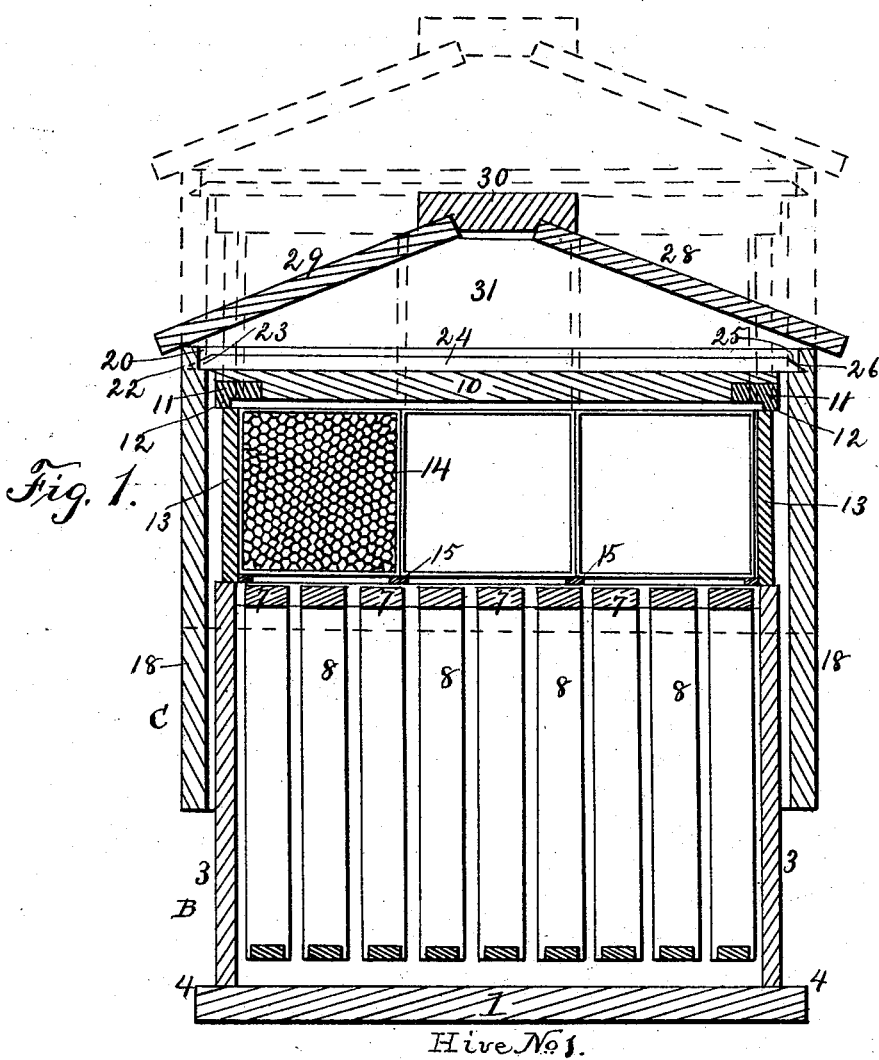
Witnesses
Ella S. Johnson,
Anna Mabel Norris.
Inventor
Francis Danzenbaker
By his Attorneys
Johnson & Johnson (No Model.)   6 Sheets—Sheet 2.
F. DANZENBAKER.
BEE HIVE.
No. 375,269.   Patented Dec. 20, 1887.
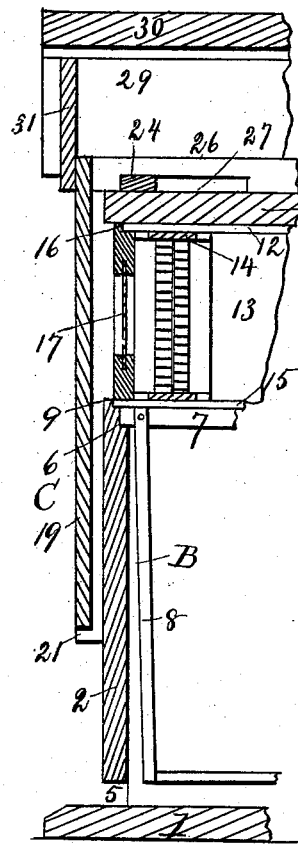
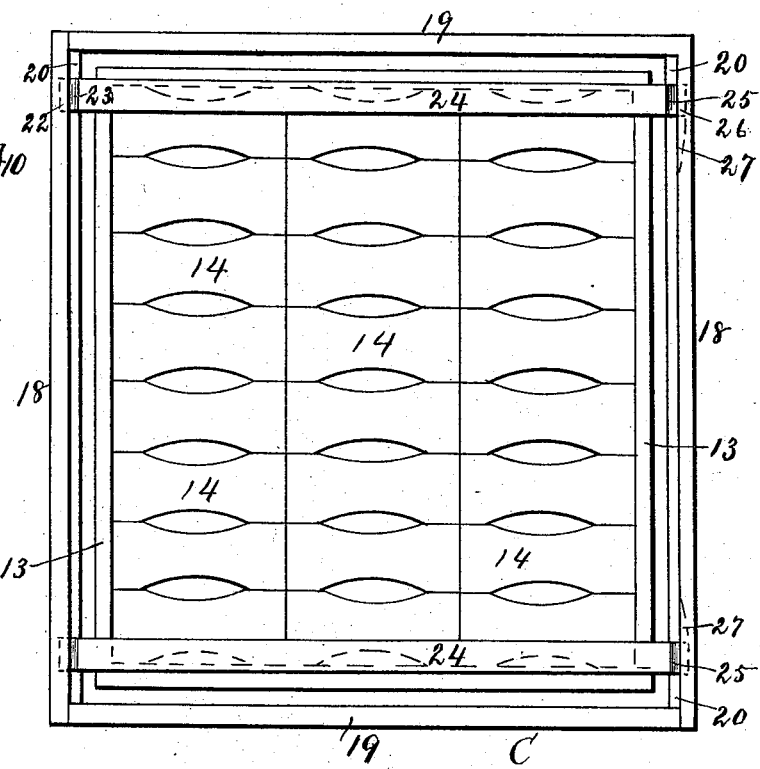
Witnesses
Ella S. Johnson,
Anna Mabel Norris.
Inventor
Francis Danzenbaker
By his Attorneys (No Model.)  F. DANZENBAKER.  6 Sheets—Sheet 3.
BEE HIVE.
No. 375,269.  Patented Dec. 20, 1887.
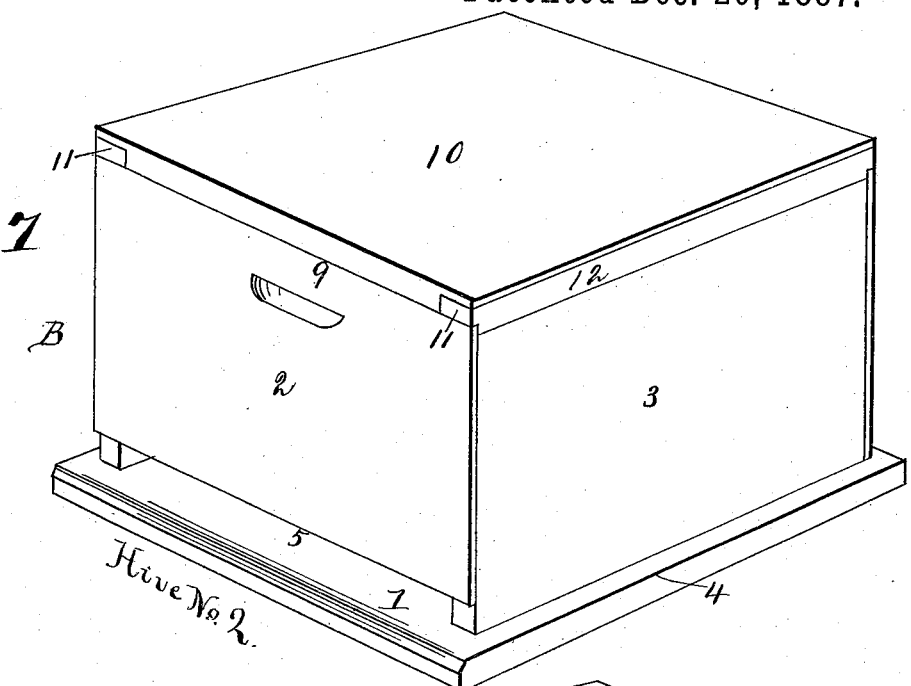
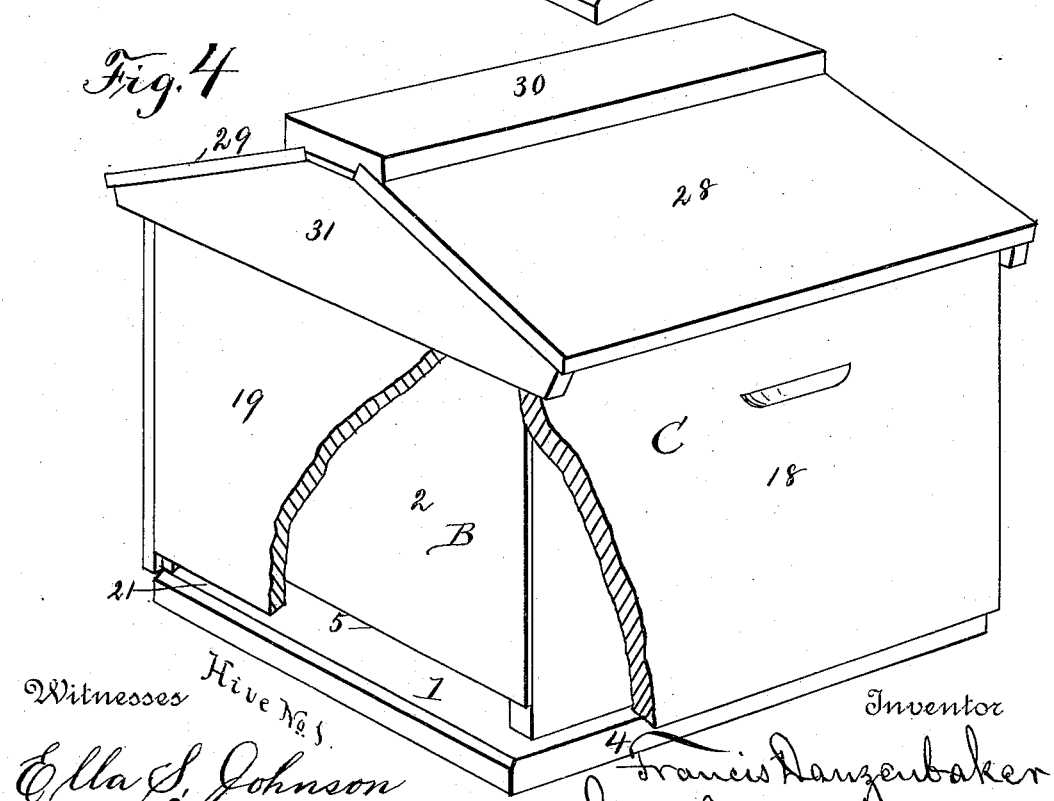

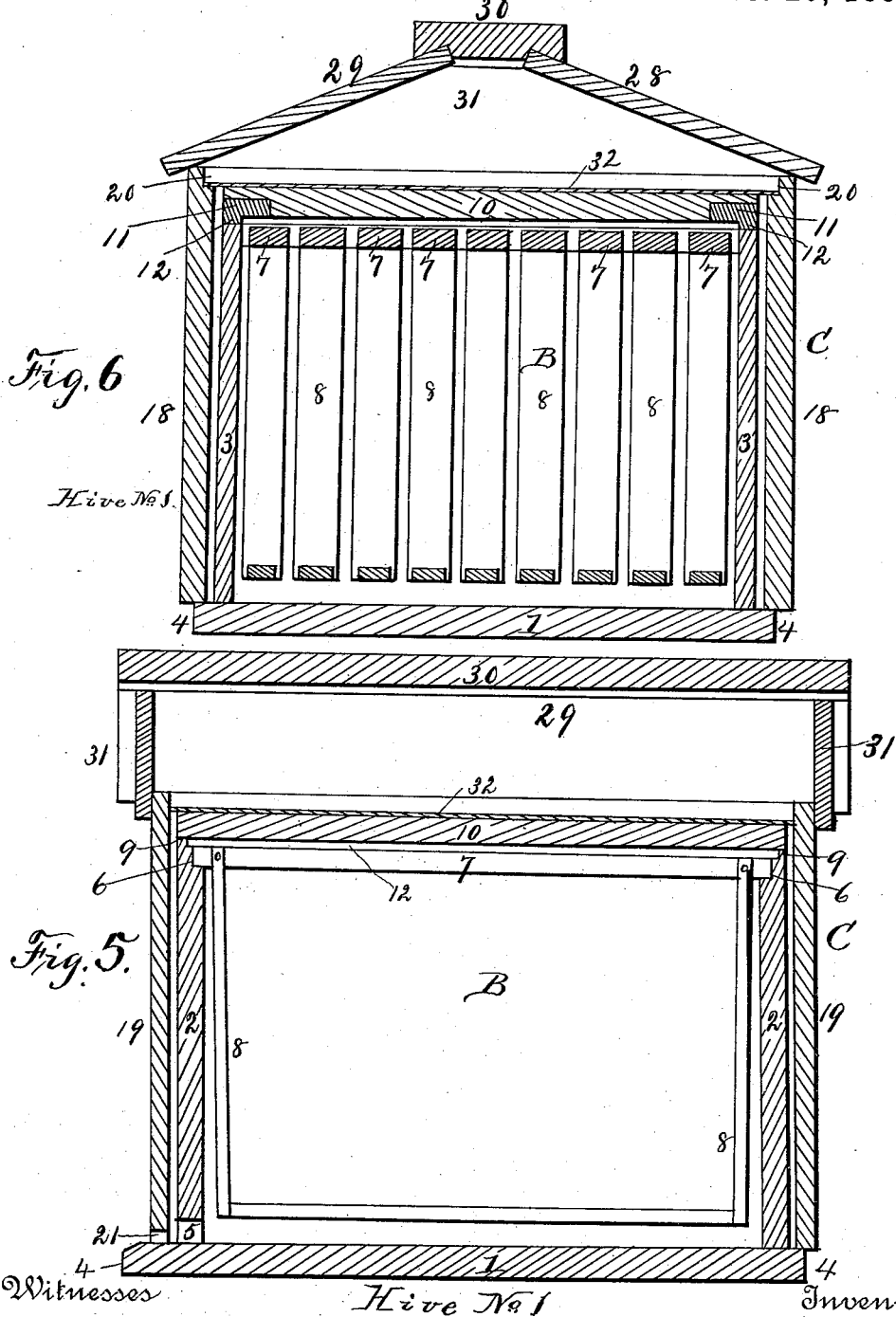

(No Model.) 6 Sheets—Sheet 5.

F. DANZENBAKER.
BEE HIVE.

No. 375,269. Patented Dec. 20, 1887.

Witnesses
Ella S. Johnson
Anna Mahl Norris

Inventor
Francis Danzenbaker
By his Attorneys
Johnson & Johnson (No Model.) 6 Sheets—Sheet 6.

F. DANZENBAKER.
BEE HIVE.

No. 375,269. Patented Dec. 20, 1887.

Hive No. 3.

Hive No. 3.

Witnesses
Ella S. Johnson
Anna Mabel Norris

Inventor
Francis Danzenbaker
By his Attorneys
Johnson & Johnson

UNITED STATES PATENT OFFICE.

FRANCIS DANZENBAKER, OF CLAYMONT, DELAWARE.

BEE-HIVE.

SPECIFICATION forming part of Letters Patent No. 375,269, dated December 20, 1887.

Application filed August 13, 1887. Serial No. 246,854. (No model.)

*To all whom it may concern:*

Be it known that I, FRANCIS DANZENBAKER, a citizen of the United States, residing at Claymont, in the county of New Castle and State of Delaware, have invented new and useful Improvements in Bee-Hives, of which the following is a specification.

This invention relates to bee-hives; and it has principally for its object to provide a hive which may, when necessity requires it, be divided or converted into three different forms of a hive capable of holding the same size of brood-frames, having also for its object to provide a hive which may be easily accessible for removing the surplus-honey racks, and which may be conveniently and effectually protected from heat or cold at the various seasons.

It is often desirable during the summer or swarming season to have reserve hives, which may immediately be placed in position for use in case a swarm leaves a colony, and I therefore construct the outer casing for the hive in such a manner that it may be used as a second and independent hive and may hold the same-sized brood-frames as the brood-chamber, so that brood-frames filled with cells and having bees sitting upon them may be placed into the new hive and serve as foundations for the new colony without the necessity of wasting time in brushing the bees off from the frames, as the bees all belong to the same original colony and have the same smell. This obviates the necessity of having a great number of extra hives, it being merely necessary to have a number of extra frames, with which the old and the new hive may be complemented, in addition to the filled frames divided between the two colonies, and as the bees all belong to the same original colony they may be permitted to remain on the filled frames. If frames from another colony were taken to start a new hive in the usual manner, all bees adhering to the frames would have to be brushed off, as otherwise they would be killed by the new swarm, which process of brushing off the bees would consume time, which is precious when the bees are swarming, as they are liable to fly off beyond reach if not promptly accommodated with suitable quarters.

The construction of the various parts of the hive by means of which I attain the above objects is illustrated in the accompanying drawings, and will be fully explained in the following description, and specifically pointed out in the claims.

Figure 8:
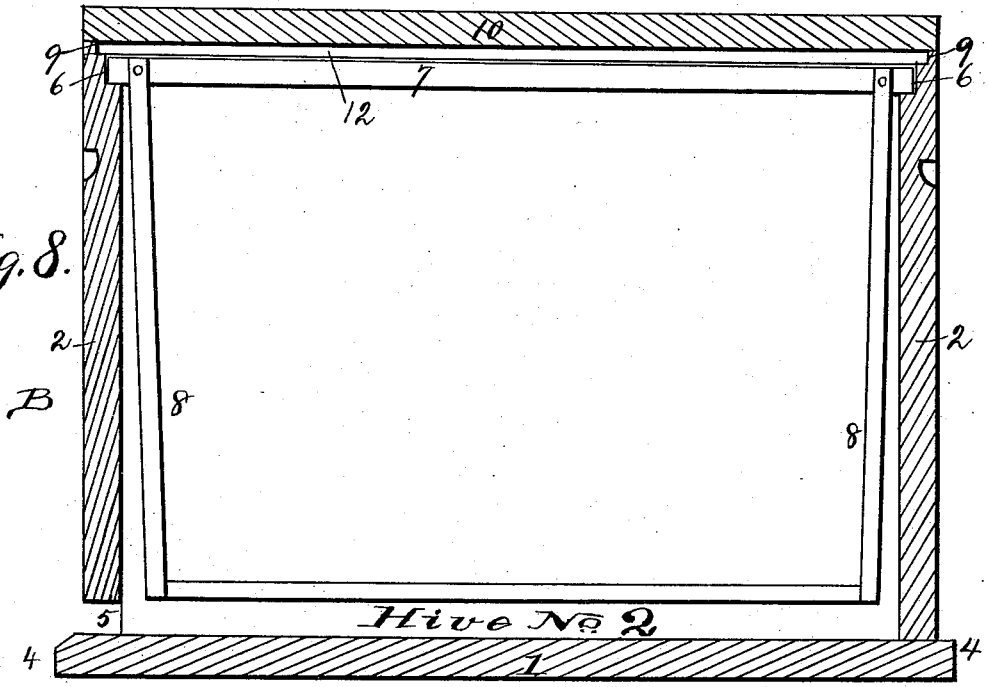
Figure 11:
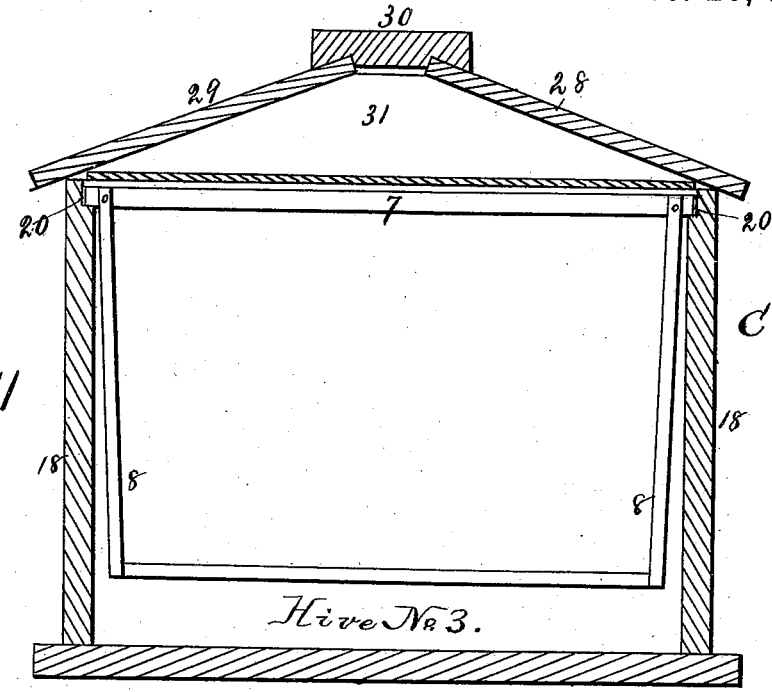
Figure 10:
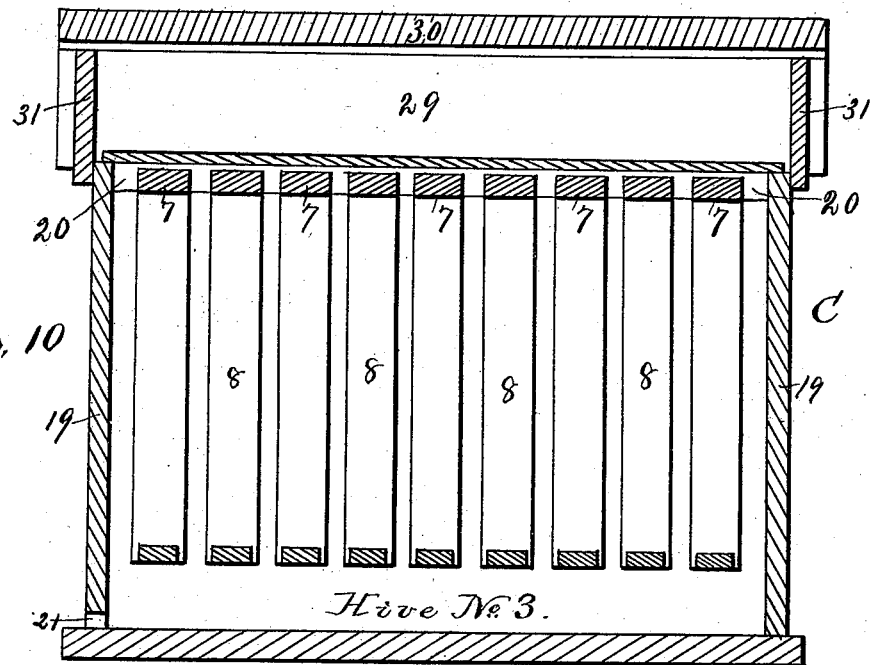

In the drawings, Figure 1 is a transverse sectional view of my improved bee-hive, showing it as it is used during the summer while the bees are making surplus honey and in the form termed "hive No. 1," and showing in dotted lines another surplus-honey rack and the outer casing raised. Fig. 2 is a partial longitudinal vertical sectional view of the same. Fig. 3 is a top plan view of the hive with the roof removed, showing the strips supporting the outer casing. Fig. 4 is a perspective view of the hive No. 1 ready for wintering the bees, the lower corner of the outer casing being shown broken away. Fig. 5 is a longitudinal vertical sectional view of this form. Fig. 6 is a transverse sectional view of the same. Fig. 7 is a perspective view of the hive proper or the brood-chamber, constituting hive No. 2 as it appears in the spring before the bees commence making extra honey. Fig. 8 is a longitudinal vertical sectional view of the same. Fig. 9 is a transverse sectional view of the latter. Fig. 10 is a longitudinal vertical sectional view of the extra hive, or hive No. 3. formed by the outer casing and roof; and Fig. 11 is a transverse sectional view of the same.

The same letters and numerals of reference indicate corresponding parts in all the figures.

In the accompanying drawings, the numeral 1 indicates the base-board of the hive, and this board has its edges 4 slightly projecting beyond the end pieces, 2, and side pieces, 3, of the brood-chamber. The end pieces of the brood-chamber are formed by boards of nearly twice the thickness of the side pieces, the thickness of the end pieces being preferably seven-eighths of an inch, while the sides are one-half of an inch thick, and one of the end pieces, 2, is cut away at its lower end to form the entrance 5, extending the entire width of the said end piece.

The inner sides of the upper edges of the end pieces are rabbeted, or rebated as shown at 6, and the projecting ends of the top pieces, 7, of the brood-frames 8, which are of the usual construction, rest in these rebates or rabbets, and the portions 9 of the upper edges of the end pieces, 2, outside of the rabbets are formed with projections 9 integral with them and of the thickness of a bee-space.

The surplus-honey rack 13, containing the surplus-honey sections 14, is supported upon the top of the brood-chamber B, and has its end pieces, which are preferably formed with panes, 17, of glass, resting upon the upper edges of the end pieces of the brood-chamber, confined by the rabbets upon the same.

The rack is provided with longitudinal supporting-slats 15, forming the open bottom of the rack, upon which the sections are supported, and the upper edges of the end pieces of the rectangular rack are provided with projections 16 of the thickness of a bee-space.

A cover or lid, 10, is formed at its side edges with two cleats or strips, 11, rabbeted into the edges at their under sides and preventing warping of the same, and the under sides of these cleats or strips are formed with ribs or strips 12 of the thickness of a bee-space, so that the cover or lid may rest upon the top of either the brood-chamber or a surplus-honey rack and have its flat ends resting upon the projections of the end pieces of the said chamber or rack and the ribs or strips upon the under sides of its side edges resting upon the flat upper edges of the chamber or rack, the projections of the end pieces and of the cover or lid forming a perfectly tight and snug fit of the latter and leaving a bee-space between the under side of the lid and the top pieces of the brood frames or sections of the chamber or rack.

By having the cover or lid raised a bee-space above the brood-frames in the brood-chamber, or above the sections in the honey-rack, the bees will have a free passage above the said frames or sections, which at the same time will not be sufficiently large to consume any heat created by the bees, while it is sufficiently large to prevent the bees gluing the cover or lid to the tops of the frames or sections.

An outer casing, C, for the hive is formed of side pieces, 18, and end pieces, 19, the said side pieces being preferably thicker than the end pieces, the former being seven-eighths of an inch thick, while the latter are one-half of an inch thick. This outer casing, C, fits around the sides of the brood-chamber and the surplus-honey rack or racks, leaving a small space between it and the latter, and the side pieces of the casing are formed with rabbets or rebates 20 in the upper edges, in which the ends of the top pieces of the brood-frames may rest when the casing is used as an additional hive, or hive No. 3, the inside width of the outer casing being equal to the inside length of the brood-chamber.

One end piece, 19, of the casing C is cut away at the lower edge, forming an aperture, 21, which may register with and partly cover the entrance to the brood-chamber when the casing is entirely slipped down over the brood-chamber, and which forms the entrance to the extra hive, or hive No. 3, when this is formed.

The rabbet in the upper edge of one of the side pieces of the casing is formed upon the inwardly-facing side with notches 22, into which the reduced or beveled ends 23 of cross-strips 24 are inserted, and the other beveled or reduced ends, 25, of these strips are inserted into notches 26 in the rabbet of the opposite side piece, the said latter notches having each a beveled side, 27, which will admit of the ends of the strips being slipped into the notches from one side after the other ends have been inserted into the notches in the opposite side. Two of these strips are preferably used, and it will be seen that when the casing is slipped over the brood-chamber with one or more racks supported upon its top the strips will rest upon the upper edges of the side pieces of the uppermost rack, supporting the casing and leaving the sides of the brood-chamber uncovered, so that the brood-chamber may be kept sufficiently cool, the casing in the meanwhile shading and sheltering the brood-chamber.

A roof or outer top, 28, composed of the slanting sides 29, a cap-piece, 30, and triangular end pieces or gables, 31, is placed upon the top of the casing C, closing the hive, the slanting sides of the roof forming eaves projecting beyond the sides of the casing.

The entire hive, with the honey-racks over the brood-chamber, is used in the summer-time when the bees are making surplus honey, and one honey-rack is generally placed first in the hive, and after this rack is filled another rack is placed on top of the former, the outer casing and the roof being raised the height of a rack for each added rack, so that a person can see and judge from the height of the hive the number of surplus-honey racks within it without opening the hive.

In the autumn, when the bees have ceased to make surplus honey, the racks are removed. The cover or lid 10 upon the top of the uppermost rack is removed and placed upon the top of the brood-chamber, whereupon a covering, 32, consisting of layers of paper, carpet, a cushion, or any other similar article, is placed over the lid 10, and the hive again closed by the casing and roof, the said covering being out of reach of the bees and protected from being glued or gummed by propolis by the tight-fitting lid or cover, which excludes all access to the space between the casing, roof, and brood-chamber.

The casing will form an air-space between its walls and the walls of the brood-chamber, which will serve to retain the heat within the hive, and the lower edges of the casing, which now rest upon the projecting edges 4 of the base, project beyond these projecting edges, so that rain or snow cannot lodge upon the base and flow into the bottom of the hive, as will be plainly seen in Figs. 4, 5, and 6 of the drawings.

The form of hive here described, which form I term "hive No. 1," may be divided or converted into two forms of hives, which I term "hive No. 2" and "hive No. 3," hive No. 2 consisting of the brood-chamber covered by the lid or cover 10, and without the casing and roof, which form is used in the spring before the bees commence to make surplus honey, while hive No. 3 is formed by the casing and the roof, the casing being placed upon a suitable base-board and having frames supported in the rabbets of the side pieces, the said frames being of the same size as the frames used in the brood-chamber, being, in fact, generally frames removed from the brood-chamber of the original hive.

The casing and roof of the hive usually remain at the side of the original hive, or near the same, after having been removed in the spring, and as soon as the bees commence to swarm a new hive may immediately be formed for the reception of the new swarm from the casing and roof of the old hive of the swarm, placed upon a suitable base and stocked with filled brood-frames removed from the original or mother colony, the brood-frames being divided between the old colony and the new colony, and the spaces between them filled up with extra frames all of the same size and being used in common by both hives. This is accomplished and made possible by having the inside depth or length (from front to rear) of the brood-chamber the same as the width (from side to side) of the inside of the casing.

It will be seen that it is a great saving in time and in material to be able to convert one hive into two hives at a moment's notice, so that in the swarming season all swarms may be accommodated without the necessity of buying or building extra hives, and it will be observed, as already mentioned, that the contents, or rather the number of surplus-honey racks in the hives, may be known at a glance, judging by the comparative height of the hives, and that the capacity of the hives may be increased, without disturbing any of the fundamental construction of the hives, by adding an extra rack upon the top of the former rack by simply removing the outer casing and changing the cover or lid to the top of the new rack.

It will also be seen that the removable casing, which forms the shelter for the brood-chamber in the summer, and which may be used as an additional hive, will form an outer wall in the winter when the honey-racks are removed, keeping the colony warm by forming an air-space between it and the brood-chamber.

Having thus described my invention, I claim and desire to secure by Letters Patent of the United States—

1. A brood-chamber having the upper edges of its end pieces formed with rabbets for confining the surplus-honey rack, in combination with said rack having the bottom strips resting in said rabbets, as shown and described.

2. In a bee-hive, the combination of a brood-chamber having the upper edges of its end pieces projected and formed with rabbets with a cover or lid having downwardly-projecting side strips the same thickness as the depth of the rabbets of the end pieces and resting with its plain under side upon the end pieces and with its strips upon the side pieces of the brood-chamber, as set forth.

3. In a bee-hive, the combination of the brood-chamber having rabbets in its end pieces, brood-frames resting with the ends of their top pieces in the rabbets, and an outer casing fitting over and around the brood-chamber, and having rabbets in the upper edges of its sides, and having the same internal width as the length or depth of the brood-chamber, whereby said casing is adapted to serve as an independent hive and carry the same-sized frames as the brood-chamber, as set forth.

4. In a bee-hive, the combination of a brood-chamber, a surplus-honey rack supported upon the top of the brood-chamber, and an outer casing fitting removably over and inclosing the surplus-honey rack and the upper portion of the brood-chamber and having removable strips or cleats secured transversely on its inner side between its upper edges and resting upon the top of the surplus-honey rack, as set forth.

5. A bee-hive having the upper edges of the end pieces of the brood-chamber rabbeted, in combination with brood-frames having their top pieces resting in said rabbets and an outer casing fitting removably over the brood-chamber and having rabbets in the upper edges of its side pieces for the support of comb-frames, the said casing being the same in width as the brood-chamber is in length and adapted to receive the frames from the brood-chamber, as set forth.

6. In a bee-hive, the combination of a brood-chamber, B, having the upper edges of its end pieces formed with rabbets 6 and 9 and provided with entrance 5 and comb-frames 8, lid 10, having side strips on its under side and resting upon the brood-chamber, the removable casing C, fitting over the brood-chamber and having the entrance 21, the bottom 1, and roof 28, as set forth.

7. In a bee-hive, the combination of a brood-chamber, a surplus-honey rack supported upon the top of the same, an outer casing having the upper edges of its sides rabbeted and formed with plain notches 22 in one face of the rabbet of one side, and with notches 26, having beveled ends 27, in the facing side of the rabbet of the opposite side, and strips having their beveled ends inserted into the notches and resting upon the surplus-honey rack, as set forth.

8. A bee-hive consisting of a brood-chamber, B, having brood-frames, a surplus-honey rack, 13, a removable casing, C, fitting over the rack and upper part of the brood-chamber and supported upon the rack, the lid 10, the strips 24, held in the upper part of the casing, and the removable roof 28, all constructed substantially as and for the purpose set forth.

In testimony whereof I have hereunto set my hand in the presence of two subscribing witnesses.

FRANCIS DANZENBAKER.

Witnesses:
A. E. H. JOHNSON,
ANNA MABEL NORRIS.